March 20, 1951

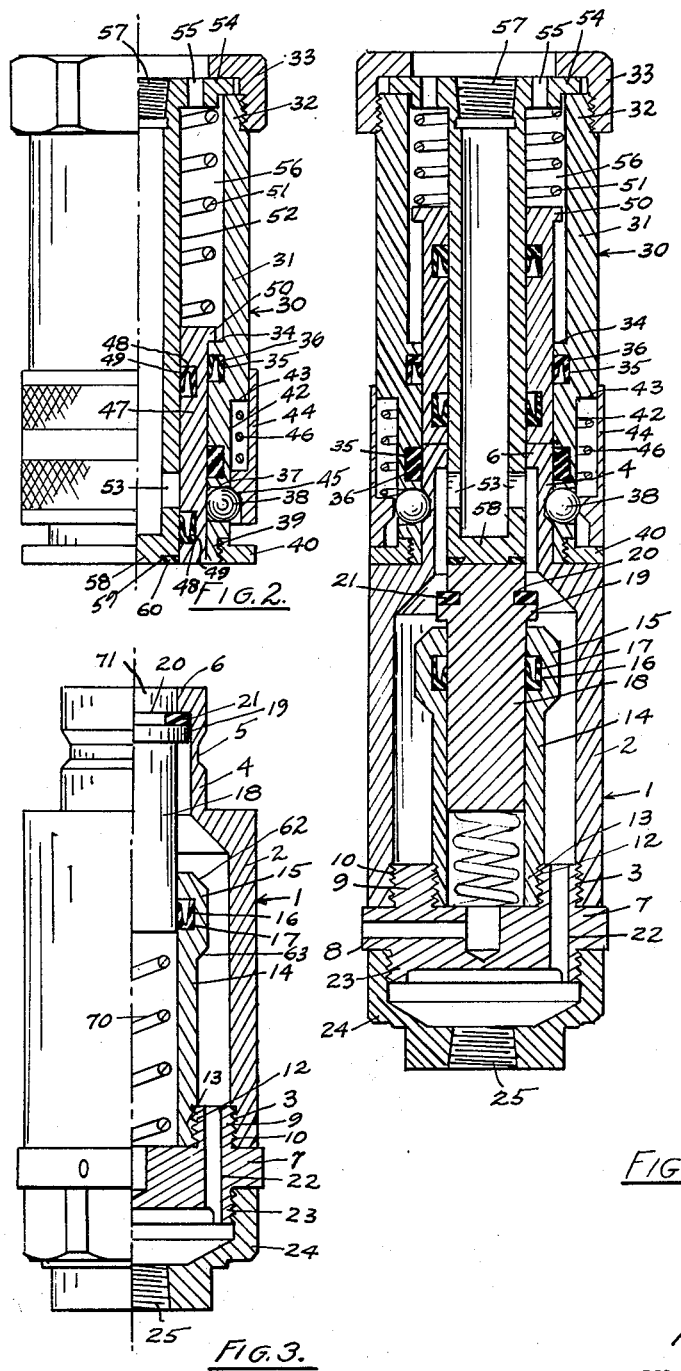

A. T. SCHEIWER 2,545,796

QUICK RELEASE COUPLING FOR
HIGH-PRESSURE FLUID LINES

Filed Oct. 8, 1947

INVENTOR
Albert T. Scheiwer
BY
Florian G. Miller
ATTORNEY

Patented Mar. 20, 1951

2,545,796

UNITED STATES PATENT OFFICE 2,545,796

QUICK-RELEASE COUPLING FOR HIGH-PRESSURE FLUID LINES

Albert T. Scheiwer, Erie, Pa.

Application October 8, 1947, Serial No. 778,597

4 Claims. (Cl. 284—19)

This invention relates generally to couplings for hose members and the like and it relates more particularly to hose couplings for high pressure lines having check valves therein.

It has heretofore been a practical impossibility to connect a hose coupling together under high pressure. This is particularly desirable where the coupling member is disposed on the lower portion of a large tank having a high head. No couplings have heretofore been provided whereby means are provided in the coupling members to set up counteracting forces to permit connection thereof under high pressure.

It is, accordingly, an object of my invention to provide novel male and female coupling members in a coupling for connecting and disconnecting high pressure lines which is simple in construction, economical in cost, economical in manufacture, easy to install, and efficient in operation.

Another object of my invention is to provide a male and a female coupling member with check valves and auxiliary devices therein to set up counteracting forces in the couplings when connecting and disconnecting them.

Another object of my invention is to provide a coupling member having check valves in the male and female coupling members vented to atmosphere.

Other objects of my invention will become evident from the following detailed description, taken in conjunction with the accompanying drawings, in which Fig. 1 is a vertical sectional view of my novel coupling member in locked position;

Fig. 2 is a side elevational view with one-half thereof broken away for better illustration, of the female coupling member shown in Fig. 1;

Fig. 3 is a side elevational view with one side thereof broken away, of the male member shown in Fig. 1.

Figure 4:
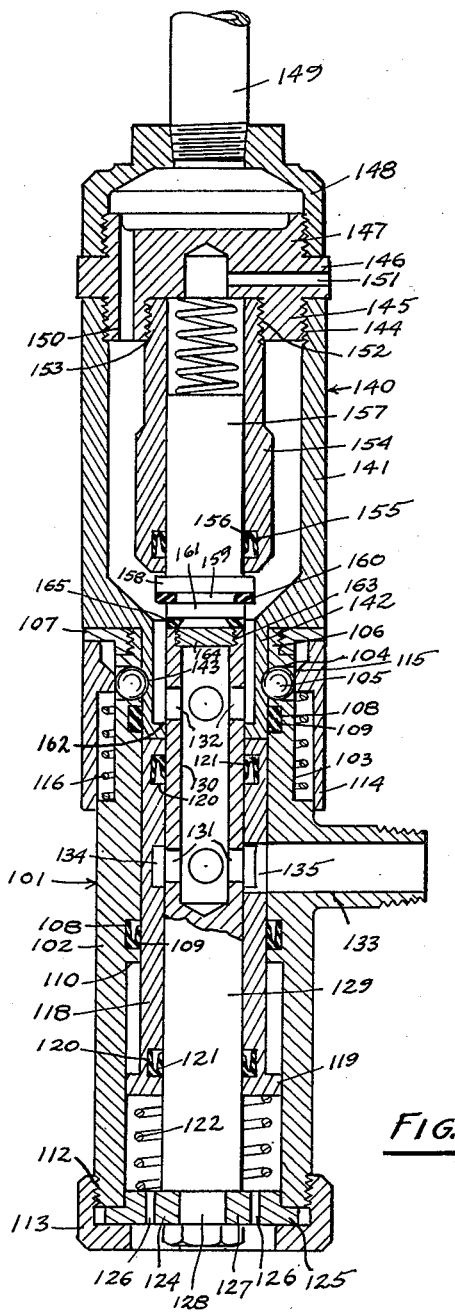
Fig. 4 is a vertical sectional view of another embodiment of my novel coupling member with the fluid entering the side of the female coupling member.

Referring now to the drawings, Figs. 1, 2 and 3 show a male coupling member 1 comprising a cup-shaped sleeve 2 having an internally threaded portion 3, a connecting portion 4 with a peripheral groove 5 and an inwardly directed end flange 6. A wall member 7 having a venting aperture 8 has an annular shaped projection 9 with an outer threaded portion 10 for threadably engaging the threaded portion 3 of the sleeve 2 and an inner threaded portion 12 for threadably engaging the threaded end 13 of the guiding sleeve 14. The guiding sleeve 14 has an enlarged head 15 and a washer groove 16 for receiving a U-shaped washer 17. A cylindrically shaped check valve 18 is telescopically disposed in the sleeve 14 and it has an outwardly extending flange portion 19 and a grooved portion 20 for receiving a sealing washer 21 which sealingly engages the flanged end 6 of the connecting portion 4 when the male member 1 is disconnected as shown in Fig. 3. The wall member 7 has longitudinally extending apertures 22 for the flow of fluid through the male coupling member. Wall member 7 also has a rearwardly projecting threaded portion 23 for threadably engaging threading cap member 24 having internally threaded portion 25 for threadably engaging a hose or any other connection. Spring member 70 urges the washer 21 on check valve 18 in sealing engagement with the end flange 6. Projection 71 on check valve 18 seals the end of connecting portion 4.

The female member 30 comprises a sleeve 31 having a threaded portion 32 for threadably engaging the cap member 33, an inner shoulder 34, inner washer groove 35 for receiving annular washers 36, ball retaining apertures 37 for holding ball members 38, a threaded portion 39 for threadably engaging a stop member 40 and an annular grooved portion 42 forming a shoulder 43. A locking sleeve 44 having a camming portion 45 is disposed over the groove portion 42 of the sleeve 31, the camming portion 45 being urged against the ball members 38 by a spring 46. A sleeve 47 having washer grooves 48 for washers 49 is telescopically disposed in the sleeve 31 and has a flanged portion 50 for engaging the shoulder 34 in the sleeve 31. A stationary cylindrical member 52 is disposed axially of the sleeve 31 and has laterally extending apertures 53 for the passage of fluid through the coupling members 1 and 30 when they are connected together as shown in Fig. 1. One end of the member 52 is flanged at 54 which is secured between the end of the sleeve 31 and the cap member 33. The flanged portion 54 also has an aperture 55 for venting to atmosphere the space 56 behind the sleeve 47. A spring member 51 urges the sleeve 47 to a position shown in Fig. 2 which is a closed position. The cylindrical member 52 also has a threaded portion 57 for threadable engagement to a hose coupling or the like. The engaging end 58 of the cylindrical member 52 has a peripheral groove 59 for receiving the washer 60 to sealingly engage the projecting end 71 of the check valve 18 in the male member 1.

When it is desired to make a connection between the male and female coupling members 1 and 30, the connecting portion 4 of the male member 1 is disposed in the sleeve 31 whereby the sleeve 47 is forced against the force of the spring 51 thereby uncovering the laterally extending apertures 53 in the member 52. At the same time the nose portion 58 of the member 52 engages the nose portion 71 of the check valve 18 in the male member 1 to move the check valve 18 to the rear out of sealing engagement with the end flange 6. It will be evident that fluid may then pass through the aperture 22 and through the male member 1 to the laterally extending apertures 53 in the member 52 and outwardly therethrough to a hose or the like to which the female member 30 is connected. It will be evident that the movable members are all vented to the atmosphere thereby preventing any pressure being set up behind the check valve 18 and sleeve 47. When the connecting portion 4 of the male member 1 is in a position shown in Fig. 1, the ball members 38 are forced into locking engagement with the peripheral groove 5 on the connecting portion 4 by the cam portion 45 of the locking sleeve 44.

When it is desired to disconnect the male and female members 1 and 30, it is only necessary to draw back the locking sleeve 44 wherein the ball members 38 move out of engagement with the peripheral groove 5 of the connecting portion 4 of the male member 1 and it may then be withdrawn from the female member 30. Upon withdrawal of the connecting portion 4 of the male member 1, the sleeve 47 is moved forwardly by the spring 51 to a position shown in Fig. 2. The sleeve 47 holds the balls 38 outwardly in the path of the cam portion 45 of the locking sleeve 44 so as to permit the connecting portion 4 of the male member 1 to be connected to the female member 30 without manual intervention except the insertion of the connecting portion 4 of the male member 1 into the female member 30. All parts of my coupling are so made that where there is a surface permitting the force to be directed in one direction, there is an opposite surface provided to counteract this force such as the two surfaces 62 and 63 on the enlarged portion of the guiding member 14 in the male member 1.

In Fig. 4, I show a coupling similar to the coupling shown in Figs. 1, 2 and 3 except that the female member has a laterally extending inlet or outlet for fluid. Referring now to Fig. 4, I show a female member 101 having a sleeve 102 with an L-shaped groove 103, ball retaining apertures 104 for receiving balls 105, a threaded portion 106 for receiving a threaded stop member 107, internal peripheral grooves 108 for receiving washers 109, an internal shoulder 110, and a threaded portion 112 for threadably engaging a threaded cap member 113. A locking sleeve 114 having a camming portion 115 is disposed over the groove 103 and is urged against the stop member 107 by a spring 116. An inner sleeve 118 having an outwardly flanged portion 119 and grooves 120 for receiving washers 121 is telescopically disposed in the sleeve 102 and the flanged portion 119 of the sleeve 118 is urged against the shoulder 110 of the sleeve 102 by a spring 122. An end member 124 having a peripheral flange 125 is secured to the end of the sleeve 102 by cap member 113. The end member 124 has air vents 126 extending therethrough and also a central aperture 127 for receiving the reduced end 128 of a cylindrical member 129 disposed in the inner sleeve 118. The cylindrical member 129 has a bore 130 with spaced laterally extending apertures 131 and 132. The apertures 131 are aligned with a laterally extending outlet 133 in the side of the sleeve 102. A peripheral groove 134 is provided in the sleeve 118 to permit free flow of fluid to or from the port 133. The sleeve 118 has an aperture 135 which is adapted to be aligned with the port 133 and the aperture 131 when the female member 101 is connected to the male member 140 as shown in Fig. 4.

The male member 140 comprises a sleeve 141 having a connecting portion 142 with a peripheral groove 143 and an internally threaded portion 144 for threadably engaging threaded portion 145 of an end member 146. The end member 146 has a threaded portion 147 for threadable engagement with a threaded adapter 148 to which is secured a pipe 149 or any other suitable coupling. The end member 146 has a longitudinally extending aperture 150 for the flow of fluid through the coupling member 140 and a venting aperture 151. The end member 146 also has an internally threaded portion 152 for threadably engaging the threaded end 153 of a guide member 154. The guide member 154 has an internal peripheral groove 155 for receiving a U-shaped washer 156. A spring-urged cylindrical check valve 157 is telescopically disposed in the guiding member 154 and it has a flanged portion 158, a grooved portion 159 for receiving a washer 160 and an extension 161 for closing the end 162 of the connecting portion 142 of the male member 140 against dust and dirt.

The cylindrical member 129 in the female member 101 has an internally threaded portion 163 for receiving a threaded plug 164 and an annular washer 165 is disposed on the end thereof.

In operation, the connecting portion 142 of the male member 140 is disposed in the female member 1 as shown in Fig. 4 and is locked by the ball members 105 and the locking sleeve 114. The connecting portion 142 of the male member 140 pushes the sleeve 118 a sufficient distance to cause the aperture 135 therein to register with the apertures 131 and port 133 to permit flow of fluid. The apertures 132 are uncovered by the connecting portion 142 of the male member 140 thereby permitting the flow of fluid through the male member 140 and through the aperture 150 to the pipe 149.

The flange portion 19 and the sealing washer 21 on the check valve 18 permit counter-acting forces on both sides thereof thereby permitting connection of the coupling members under high pressure with a minimum of manual force.

It will be evident from the foregoing description that I have provided a novel coupling having check valves in the male and female members thereof which permits easy connection and the free flow of fluid therethrough after connection thereof with a minimum of effort against a high pressure in the connecting lines. I also provide a coupling which is closed against dust and dirt when disconnected and which permits automatic connection without moving the locking sleeve after it is once connected together.

Various changes may be made in the specific embodiment of my invention without departing from the spirit thereof or from the scope of the appended claims.

What I claim is:

1. A coupling comprising a male coupling member having a connecting portion with a peripheral groove and an inwardly directed flange, a guided check valve adapted to sealingly engage the inwardly directed flange on the connecting portion of said male member; and a female coupling member comprising a cylindrical shell having cam retaining apertures, cam members in said apertures for engaging the peripheral groove on the connecting portion of said male member, a spring-urged locking sleeve for locking said cam members into locking engagement with the peripheral groove on the connecting portion of said male member to connect said male and female coupling members together, a bored cylindrical member having laterally extending apertures and a spring-urged sleeve sealingly engaging said outer shell and said inner cylindrical member adapted to cover the laterally extending apertures in said cylindrical member, and hold said cam members outwardly in the path of said locking sleeve when said female coupling member is disconnected, the connecting portion of said male member being adapted to move said movable sleeve in said female member longitudinally to uncover the laterally extending apertures in said cylindrical member whereby fluid flows between said coupling members.

2. A coupling as set forth in claim 1 wherein said guided check valve in said male coupling member and said spring-urged sleeve in said female coupling member are vented to atmosphere.

3. A coupling as set forth in claim 1 wherein the guiding means for said check valve in said male member comprises a cylindrical member sealingly vented to atmosphere in which said check valve is telescopically disposed.

4. A coupling as set forth in claim 1 wherein the check valve in said male coupling member and the spring-urged sleeve in said female coupling member move to a position flush with the ends of said coupling members when disconnected.

ALBERT T. SCHEIWER.

REFERENCES CITED

The following references are of record in the file of this patent:

UNITED STATES PATENTS

| Number | Name | Date |
|---|---|---|
| 1,493,306 | Wilkinson | May 6, 1924 |
| 2,054,772 | Light et al. | Sept. 15, 1936 |
| 2,112,146 | Di Giovanni | Mar. 22, 1938 |
| 2,254,997 | Fisher | Sept. 2, 1941 |
| 2,311,239 | Main et al. | Feb. 16, 1943 |
| 2,393,679 | Gunderson | Jan. 29, 1946 |
| 2,428,637 | Scheiwer | Oct. 7, 1947 |
| 2,439,275 | Spotz | Apr. 6, 1948 |